US012811233B2

(12) United States Patent
Kraberger

(10) Patent No.: US 12,811,233 B2
(45) Date of Patent: Nov. 24, 2026

(54) BATTERY MODULE, A BATTERY PACK, AN ELECTRIC VEHICLE, AND A METHOD FOR ASSEMBLING A BATTERY MODULE

(71) Applicant: SAMSUNG SDI CO., LTD., Yongin-si (KR)

(72) Inventor: Gernot Kraberger, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 801 days.

(21) Appl. No.: 17/980,421

(22) Filed: Nov. 3, 2022

(65) Prior Publication Data

US 2023/0137095 A1 May 4, 2023

(30) Foreign Application Priority Data

Nov. 4, 2021 (EP) .................................... 21206418
Nov. 2, 2022 (KR) ........................ 10-2022-0144678

(51) Int. Cl.
*H01M 50/258* (2021.01)
*H01M 50/209* (2021.01)
*H01M 50/249* (2021.01)

(52) U.S. Cl.
CPC ....... *H01M 50/258* (2021.01); *H01M 50/209* (2021.01); *H01M 50/249* (2021.01); *H01M 2220/20* (2013.01)

(58) Field of Classification Search
CPC .................................................. H01M 50/209
See application file for complete search history.

(56) References Cited

U.S. PATENT DOCUMENTS

2016/0164054 A1* 6/2016 Yamamoto .......... H01M 50/516 429/61
2017/0187015 A1* 6/2017 Miyamoto .......... H01M 10/425
2020/0052260 A1 2/2020 Fees et al.
2020/0243923 A1* 7/2020 Iwakura ............ H01M 10/6557
2024/0222758 A1* 7/2024 Xu ...................... H01M 50/548
(Continued)

FOREIGN PATENT DOCUMENTS

CN 1401511 A 3/2003
CN 105261807 A 1/2016
CN 212810476 U 3/2021
(Continued)

OTHER PUBLICATIONS

Extended European Search Report issued in corresponding application No. EP21206418.2, dated May 3, 2022, 10 pages.
(Continued)

*Primary Examiner* — Brian R Ohara
(74) *Attorney, Agent, or Firm* — WOMBLE BOND DICKINSON (US) LLP

(57) ABSTRACT

A battery module includes a plurality of first battery cell groups and a plurality of second battery cell groups. Each of the first battery cell groups and each of the second battery cell groups includes a plurality of stacked prismatic battery cells. At least one of the first battery cell groups is arranged adjacent to at least one of the second battery cell groups, the first battery cell groups and second battery cell groups are alternatingly stacked, and the battery cells of the first battery cell groups are oriented orthogonally to the battery cells of the second battery cell groups.

16 Claims, 2 Drawing Sheets

(56) References Cited

U.S. PATENT DOCUMENTS

| | | | | |
|---|---|---|---|---|
| 2024/0222765 A1* | 7/2024 | Xu | ........................ | H01M 50/55 |

FOREIGN PATENT DOCUMENTS

| | | | | |
|---|---|---|---|---|
| CN | 213150897 U | 5/2021 | | |
| CN | 112889178 A | 6/2021 | | |
| EP | 4379913 A1 * | 6/2002 | .............. | B60L 50/64 |
| WO | 2008/106641 A1 | 9/2008 | | |

OTHER PUBLICATIONS

Golubkov, A.W., et al., "Thermal runaway of commercial 18650 Li-ion batteries with LFP and NCA cathodes—impact of state of charge and overcharge", Table 2, From the Journal: RSC Advances, Issue 70, Jun. 22, 2015, 5, 57171-57186, 16 pages.
Chinese Notification of First Office Action, for CN Patent Application No. 202211376767.5, dated May 1, 2026, 8 pages.

* cited by examiner

BATTERY MODULE, A BATTERY PACK, AN ELECTRIC VEHICLE, AND A METHOD FOR ASSEMBLING A BATTERY MODULE

CROSS-REFERENCE TO RELATED APPLICATION

This application claims priority to and the benefit of European Patent Application No. 21206418.2, filed in the European Patent Office on Nov. 4, 2021, and Korean Patent Application No. 10-2022-0144678, filed in the Korean Intellectual Property Office on Nov. 2, 2022, the entire content of both of which are incorporated herein by reference.

BACKGROUND

1. Field

Aspects of embodiments of the present disclosure relate to a battery module for an electric vehicle, a battery pack comprising the battery module, an electric vehicle comprising the battery pack, and a method for assembling a battery module.

2. Description of the Related Art

Recently, vehicles for transportation of goods and peoples have been developed that use electric power as a source for motion. Such an electric vehicle is an automobile that is propelled by an electric motor using energy stored in rechargeable batteries. An electric vehicle may be solely powered by batteries or may be a hybrid vehicle powered by, for example, a gasoline generator or a hydrogen fuel power cell. A hybrid vehicle may include a combination of electric motor and conventional combustion engine. Generally, an electric-vehicle battery (EVB or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for electric and hybrid vehicles and the like.

Rechargeable batteries may be used as a battery module formed of a plurality of unit battery cells coupled together in series and/or in parallel to provide a high energy content, such as for motor driving of a hybrid vehicle. The battery module may be formed by interconnecting the electrode terminals of the plurality of unit battery cells in a manner depending on a desired amount of power and to realize a high-power rechargeable battery.

Battery modules can be constructed either in a block design or in a modular design. In the block design, each battery is coupled to a common current collector structure and a common battery management system, and the unit thereof is arranged in a housing. In the modular design, pluralities of battery cells are connected together to form submodules, and several submodules are connected together to form the battery module. In automotive applications, battery systems generally include a plurality of battery modules connected together in series to provide a desired voltage. The battery modules may include submodules with a plurality of stacked battery cells, and each stack includes cells connected in parallel that are, in turn, connected in series (XpYs) or cells connected in series that are, in turn, connected in parallel (XsYp).

A battery pack is a set of any number of (usually identical) battery modules. The battery modules may be configured in series, parallel, or a mixture of both to deliver the desired voltage, capacity, and/or power density. Components of a battery pack include the individual battery modules and the interconnects, which provide electrical conductivity between the battery modules.

Mechanical integration of a battery module requires appropriate mechanical connections between the individual components (e.g., between battery cells). Such connections must remain functional, such as with respect to heat conductance, and safe during the average service life of the battery system. Further, installation space and interchangeability requirements must be met, especially in mobile applications.

Exothermic decomposition of cell (e.g., a battery cell) components may lead to a so-called thermal runaway. Generally, thermal runaway refers to a process that is accelerated by increasing temperature, in turn releasing energy that further increases temperature. Thermal runaway occurs when an increase in temperature in a cell changes the conditions in a way that causes a further increase in temperature, often leading to a destructive result. In rechargeable battery systems, thermal runaway is associated with strong exothermic reactions that are accelerated by temperature rise. These exothermic reactions can include combustion of flammable gas compositions within the battery pack housing. For example, when a cell is heated above a critical temperature (typically above 150° C.) it can transition into a thermal runaway. The initial heating may be caused by a local failure, such as a cell internal short circuit, heating from a defective electrical contact, short circuit with a neighboring cell, etc. During the thermal runaway, a failed battery cell (e.g., a battery cell which has a local failure) may reach a temperature exceeding 700° C. Further, large quantities of hot gas are ejected from inside of the failed battery cell through the venting opening in the cell housing into the battery pack. The main components of the vented gas are $H_2$, $CO_2$, CO, electrolyte vapor, and other hydrocarbons. The vented gas is therefore flammable and potentially toxic. The vented gas also causes a gas-pressure increase inside the battery pack.

Generally, there are two concepts for integrating prismatic cells into a battery pack: in a module structure and in a cell-to-pack fashion. The latter can avoid extra interfaces and, thus, extra cost. In either of these arrangements, however, battery cells all are typically oriented in the same way. However, high energy densities of the cells, a high packing density of the cells within the battery pack, and relatively good thermal contact between the cells may lead to increased safety issues in the event of a thermal runaway of at least one cell. When a battery cell transitions into thermal runaway triggered by, for example, overtemperature, overcharging, internal or external short circuit, its stored electrical and chemical energy will be released in a sudden chemical reaction. This causes the battery cell to heat up and may cause it to transition into thermal runaway at temperatures up to 1000° C. or more depending on the energy density. With typical battery cell masses of around 1 kg and a heat capacity of roughly 1 kJ/K kg, a cell heating from 0° C. to 1000° C. corresponds to an energy of about 1 MJ. In the conventional cell arrangement as shown in FIG. 3, a battery cell will typically transfer most of its heat to its two nearest neighbors, that is, the two battery cells within the battery cell group which are in contact (e.g., which touch each other) via a longitudinal side surface of the battery cell (e.g., the x-direction side in, for example, FIG. 2). Assuming adiabatic conditions on all other surfaces, which is a good approximation if there is a good thermal insulation on the other surfaces, each neighboring battery cell receives half of the released energy (about 500 kJ) and consequently heats up by 500° C., which is enough to trigger thermal runaway, which generally occurs at around 150° C.–170° C. The propagation continues until all battery cells in the cell stack and/or the battery module have entered thermal runaway. Conventionally, thermal runaway propagation is avoided by, for example, compartmentalization of battery cells. However, compartmentalization is expensive and takes up a lot of space.

BRIEF SUMMARY

The present disclosure is defined by the appended claims and their equivalents. Any disclosure outside the scope of the claims and their equivalents is intended for illustrative as well as comparative purposes.

According to one embodiment of the present disclosure, a battery module includes a plurality of first battery cell groups and a plurality of second battery cell groups. At least one of the first battery cell groups is adjacent to at least one of the second battery cell groups, and each of the first battery cell groups and each of the second battery cell groups includes a plurality of stacked prismatic battery cells. The first battery cell groups and the second battery cell groups are alternatingly stacked, and the battery cells of the first battery cell group are oriented orthogonally to the battery cells of the second battery cell group.

According to another embodiment of the present disclosure, a battery pack includes at least one battery module according to an embodiment of the present disclosure.

Another embodiment of the present disclosure provides an electric vehicle includes at least one battery module and/or at least one battery pack according to an embodiment of the present disclosure.

Yet another embodiment of the present disclosure provides a method for assembling a battery module according to an embodiment of the present disclosure. The method includes the steps of: a) providing the plurality of first battery cell groups and the plurality of second battery cell groups; and b) arranging at least one of the first battery cell groups adjacent to at least one of the second battery cell groups so that the first battery cell groups and second battery cell groups are alternatingly stacked.

Further aspects, features, and embodiments of the present disclosure can be learned from the dependent claims and/or the following description.

BRIEF DESCRIPTION OF THE DRAWINGS

Aspects and features of the present disclosure will become apparent to those of ordinary skill in the art by describing, in detail, embodiments thereof with reference to the attached drawings, in which.

DETAILED DESCRIPTION

Figure 1:
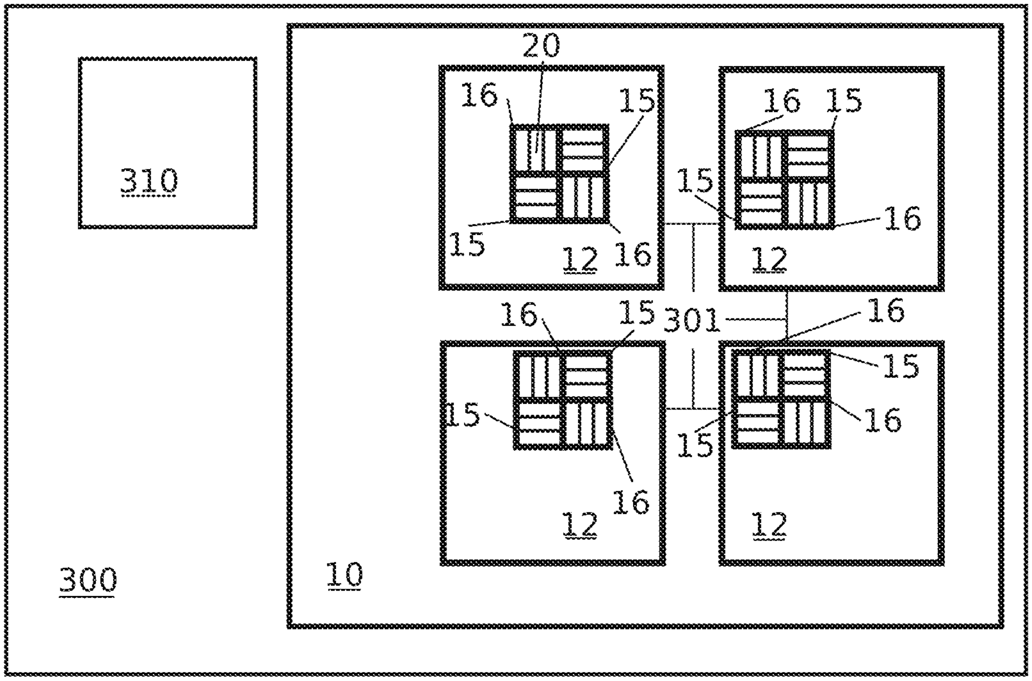
FIG. 1 is a schematic view of an electric vehicle according to an embodiment.

Reference will now be made, in detail, to embodiments, examples of which are illustrated in the accompanying drawings. Aspects and features of the embodiments, and implementation methods thereof, will be described with reference to the accompanying drawings. In the drawings, like reference numerals denote like elements, and redundant descriptions may be omitted.

According to one embodiment of the present disclosure, a battery module is provided. The battery module includes a plurality of first battery cell groups and a plurality of second battery cell groups. Each of the battery cell groups includes an arrangement of a plurality of battery cells to form the battery cell group. The first battery cell groups and the second battery cell groups are separated from each other by a cell group boundary that defines the spatial domains of the battery cell groups without necessarily being a physical (e.g., mechanical) boundary arrangement. At least one of the first battery cell groups is arranged adjacent to at least one of the second battery cell groups. For example, at least one of the first battery cell groups is adjacent to at least one of the second battery cells. The first battery cell group and the second battery cell group are separated from each other by a cell group boundary, and at least one battery cell of the first battery cell group is in contact with at least one battery cell of the neighboring second battery cell group. The adjacent arrangement of first battery cell groups and second battery cell groups ensures thermal contact between adjacently arranged (e.g., perpendicularly arranged) battery cell groups so that heat can be transferred from one battery cell group to its adjacent (e.g., neighboring) battery cell group. Each of the first battery cell groups and each of the second battery cell groups includes a plurality of stacked (e.g., arranged) prismatic battery cells. Each of the first battery cell groups may be called a first battery cell stack, and each of the second battery cell groups may be called a second battery cell stack. Therein, the first battery cell groups and second battery cell groups are alternatingly stacked. For example, the stacking pattern (e.g., the arrangement direction) of each of the first battery cell groups is different than the stacking pattern (e.g., the arrangement direction) of each of the second battery groups. The adjacent arrangement of the first and second battery cell groups and their alternating arrangements provides that, from battery cell group to battery cell group, the stacking of battery cells within the battery cell groups varies periodically in a discrete manner. For example, the battery cells of the first battery cell groups are stacked so that they are oriented differently than the battery cells of the second battery cell groups. The difference in the stacking pattern distinguishes the first battery cell groups from the second battery cell groups. In other words, the battery module includes different battery cell groups, which are distinguishable from each other by their stacking pattern of stacked battery cells, and the different battery cell groups form domains in which the stacking pattern alternates from domain to domain. In one embodiment, the battery cell groups are arranged in a checkerboard pattern, and sites of the checkerboard are alternatingly occupied by either one of the first battery cell groups or by one of the second battery cell groups.

The alternating stacking of the first battery cell groups and the second battery cell groups improves the thermal conductance between battery cells at the cell group boundaries between a first battery cell group and a neighboring second battery cell group. The alternating stacking implies that a battery cell of the first battery cell group is in thermal contact with a plurality of battery cells of a neighboring second battery cell group. Thus, the battery cells of the first battery cell group can transfer its thermal energy to the plurality of battery cells of the neighboring second battery cell group, which improves heat conduction between battery cell groups and prevents (or ceases expansion of) thermal runaway. The same concepts apply to a second battery cell group. For example, due to the alternating stacking, a battery cell of the second battery cell group is in thermal contact with a plurality of battery cells of a neighboring first battery cell group. Thus, the battery cells of the second battery cell group can transfer its thermal energy to the plurality of battery cells of the neighboring first battery cell group. In some embodiments, thermally isolating spacers are included between battery cell groups, but these may be omitted or may be smaller than in the prior art.

The battery cells of the first battery cell group are oriented orthogonally to the battery cells of the second battery cell group. In other words, the battery cells of the first battery cell group are stacked and arranged to be orthogonal (e.g., perpendicular) to battery cells of the second battery cell group. The battery cells of the first battery cell group are rotated 90° with respect to the battery cells of the second battery cell group. This arrangement helps avoid (or limits expansion of) thermal runaway by providing improved thermal contact between neighboring battery cell groups while being space-saving and cost-effective to manufacture. In this arrangement, a battery cell of a first battery cell group contacts maximal number of battery cells of a second battery cell group, compared with other orientations, which provides effective heat conductance.

In some embodiments, each of the first battery cells groups includes at least one neighboring second battery cell group, and each of the neighboring first battery cell groups and second battery cell groups are alternatingly stacked. This provides an alternating arrangement of first battery cell groups and second battery cell groups extending among neighboring battery cell groups. In some embodiments, at least one of the first battery cell groups includes at least another one of the first battery cell groups as its next-nearest neighbor, and said first battery cell group and the next-nearest second battery cell group are stacked in the same manner. For example, the battery module may include a one-dimensional arrangement of battery cell groups with the first battery cell groups and the second battery cell groups being alternatingly arranged.

In some embodiments, the first battery cell groups and the secondary battery cell groups are arranged in a two-dimensional lattice including lattice sites arranged in at least two rows and at least two columns. In this embodiment, the term lattice does not refer to a physical structure, for example, for mounting the battery cell groups. The lattice refers to the arrangement of battery cell groups in a mathematical sense to define that the battery cell groups are arranged in a regular pattern on the lattice sites. Therein, either one of the first battery cell groups or one of the second battery cell groups is arranged on each lattice site. This provides an effective arrangement of battery cell groups in a regular pattern that may improve the mountability of the battery module.

In some embodiments, the battery module includes thermally insolating spacers arranged between the battery cell groups to further avoid thermal runaway. A spacer may be electrically insolating to improve electrical safety, for example, to avoid creepage and/or to provide electrical clearance.

In some embodiments, the first battery cell groups and the second battery cell groups are arranged so that one battery cell of the first battery cell group is arranged to touch (e.g., to contact) a plurality of (in some embodiments, each of) the cells of a neighboring second battery cell group. In this embodiment, the first battery cell group may be arranged so that a battery cell of the first battery cell group and its boundary touches a plurality of (or each of) the cells of a neighboring second battery cell group to provide improved heat conductance between said battery cell of the first battery group and the neighboring second battery cell group. In some embodiments, each of the battery cells has a narrow side surface and a longitudinal side surface, and the first battery cell groups and the second battery cell groups are arranged so that one battery cell of the first battery cell group is arranged to touch, along its longitudinal side surface, a plurality of (or each of) the battery cells of a neighboring second battery cell group at their narrow side surfaces.

In some embodiments, one battery cell of one of the first battery cell groups has a longitudinal side surface that contacts a plurality of narrow side surfaces of battery cells of a neighboring second battery group, and a sum of the areas of the narrow side surfaces is less than or equal to the area of the longitudinal side surface. This arrangement may improve heat conductance between the battery cell with its longitudinal side surface and the battery cells with their respective narrow side surfaces as the battery cell of the first battery cell group is, or can be brought, in contact with the plurality of battery cells of the second battery cell group.

In some embodiments, an elongation (e.g., a length or dimension) of a battery cell in a first direction is an integer multiple of an elongation of the battery cell in a second direction, thereby allowing a more efficient arrangement of alternatingly stacked battery cell groups. For example, one battery can contact, with its plane surface extending along the first direction, a plurality of battery cells of a neighboring battery cell group, at their plane surfaces extending along the second direction.

In some embodiments, each of the battery cells has the same shape and/or each of the first and second battery cell groups has the same shape with a square cross-section. By having the same shape, the battery cells can be efficiently stacked to form battery groups and an alternating arrangement of first battery cell groups and second battery cell groups may be improved. By having the same shape, the first battery cell groups and the second battery cell groups with a square cross-section may improve the arrangement of the battery groups in an alternating manner, and the battery cell groups having the same size and the alternating arrangement thereof provides checkerboard pattern with equally-sized square sites on the checkerboard at where the battery cell groups are arranged.

In some embodiments, the number of battery cells in each of the first battery cell groups and the number of battery cells in each of the second battery cell groups are the same. The size of each of the first battery cell group and the size of each of the second battery cell groups are equal when they include the same number of battery cells with the same aspect ratio. This allows an effective arrangement of battery cell groups.

According to another embodiment of the present disclosure, a battery pack is provided. The battery pack includes at least one battery module as described above. Thus, aspects and features as described above apply to the battery pack.

Another embodiment of the present disclosure refers to an electric vehicle. The electric vehicle includes at least one battery module as described above and/or at least one battery pack as described above. Thus, aspects and features as described above apply to the electric vehicle.

Yet another embodiment of the present disclosure provides a method for assembling a battery module. The method includes the steps providing the plurality of first battery cell groups and the plurality of second battery cell groups and arranging at least one of the first battery cell groups adjacent to at least one of the second battery cell groups so that the first battery cell groups and second battery cell groups are alternatingly stacked. The assembled battery module coincides with the battery module as described above. Thus, the aspects and features as described above apply analogously to the method for assembling the battery module.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

FIG. 1 illustrates a schematic view of an electric vehicle 300 according to an embodiment of the present disclosure. The electric vehicle 300 is propelled by an electric motor 310, using energy stored in rechargeable batteries arranged in a battery pack 10. The battery pack 10 is a set of any number of battery modules 12. Rechargeable batteries are used in a battery module 12, formed of a plurality of secondary battery cells 20. In FIG. 1, only one secondary battery cells 20 is indicated with a reference numeral merely for ease of understanding. Components of the battery pack 10 include the individual battery modules 12 and interconnects 301, which provide electrical conductivity between the battery modules 12.

Each of the battery modules 12 includes two first battery cell groups 15 and two second battery cell groups 16. The two first battery cell groups 15 and two second battery cell groups 16, and a two-dimensional arrangement of the battery cell groups 15, 16, are shown in FIG. 1 as an example. However, each of the battery modules 12 may, depending on the size of the battery cells 20, the aspect ratio of the battery cells 20, and the number of battery cells 20 within the battery cell groups 15, 16, include another suitable number of first battery cell groups 15 and/or of second battery cell groups 16 in addition to the two first battery cell groups 15 and the two second battery cell groups 16. The first battery cell groups 15 and the second battery cell groups 16 may be arranged differently than shown in FIG. 1. The battery modules 12, as shown in FIG. 1, are described in more detail with reference to FIG. 4.

Figure 2:
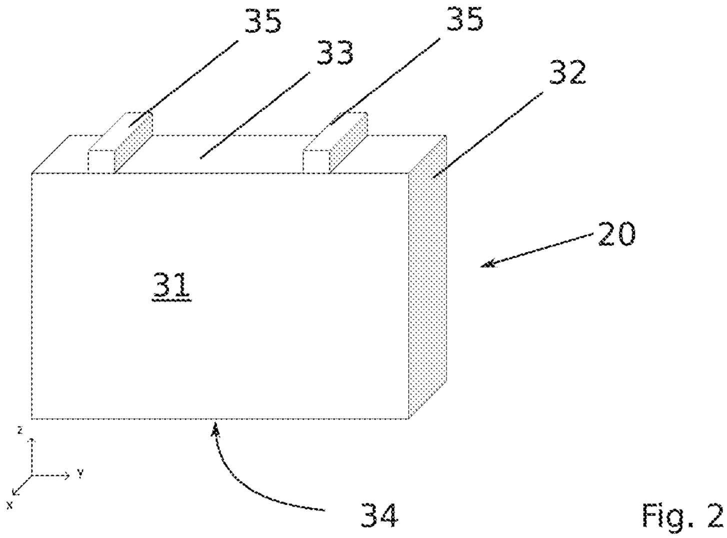
FIG. 2 is a schematic perspective view of a battery cell according to an embodiment of the present disclosure.

FIG. 2 illustrates a schematic perspective view of a battery cell 20. The battery cell 20 is prismatic (e.g., the battery cell 20 has three pairs of oppositely arranged and basically flat surfaces that are perpendicular to each other). The battery cells 20 has a pair of longitudinal side surfaces 31 (e.g., the largest flat surface of the battery cell 20), a pair of narrow side surfaces 32, and a bottom surface 34. The components together build a sealed case to contain (or accommodate) the electrochemical components of the battery cell 20. The opening in the case is tightly sealed with a casing cover 33 having a pair of battery connectors (e.g., terminals) 35 at its top.

Figure 4:
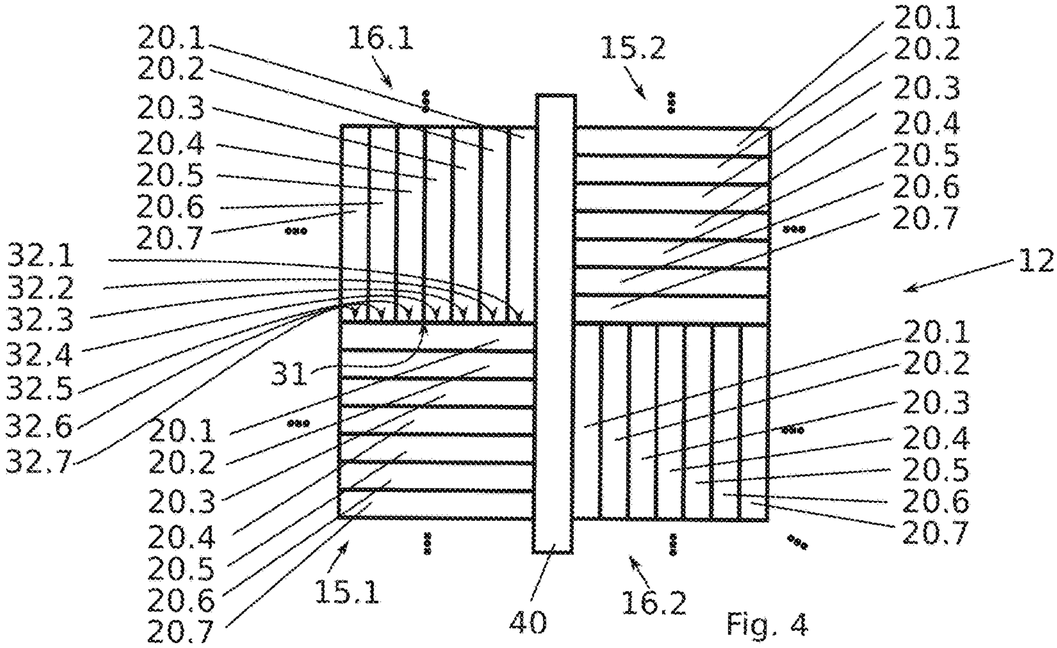
FIG. 4 is a schematic view of a battery module according to an embodiment of the present disclosure.
Figure 5:
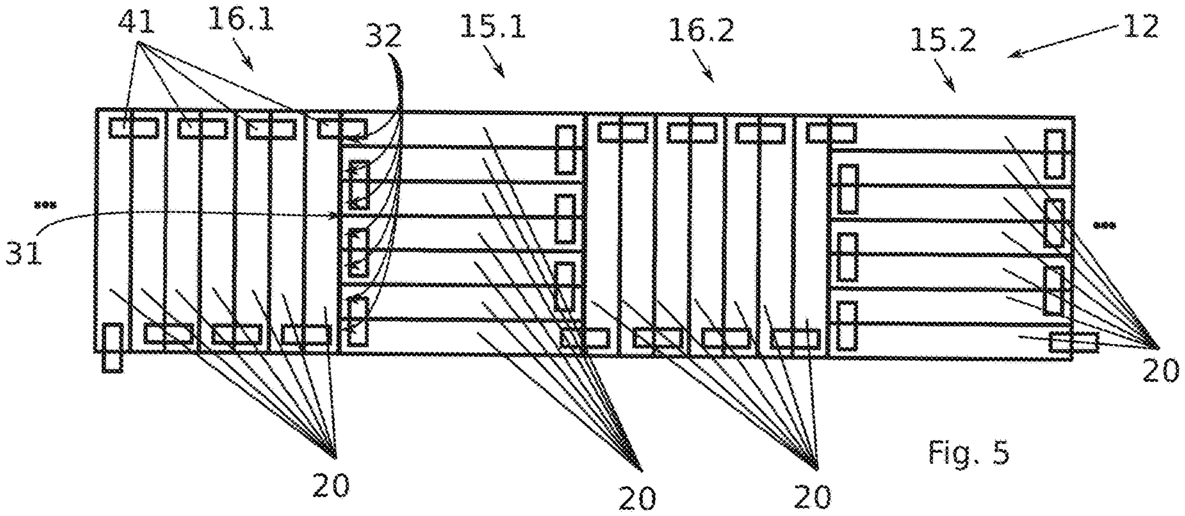
FIG. 5 is a schematic view of a battery module according to another embodiment of the present disclosure.

As shown in FIGS. 4 and 5 and explained with reference thereto, the battery cells 20 are arranged so that the longitudinal side surface 31 contacts the longitudinal side surface 31 of a neighboring battery cell 20 within the same battery cell group 15.1, 15.2, 16.1, 16.2 or so that the longitudinal side surface 31 contacts the plurality of smaller flat surfaces (e.g., the narrow side surfaces 32) of a plurality of battery cells 20 of a neighboring battery cell group 15.1, 15.2, 16.1, 16.2. The sum of the areas of the narrow side surfaces 32 is less than or equal to the area of the longitudinal side surface 31.

As shown in FIG. 2, the battery cell 20 includes electrical connectors 35 to electrically interconnect the battery cell 20 with, for example, another battery cell 20 and/or a battery management module via one or more a current collector structures, such as busbars 41 (see, e.g., FIG. 5) that are electrically connected to the electrical connectors 35.

Figure 3:
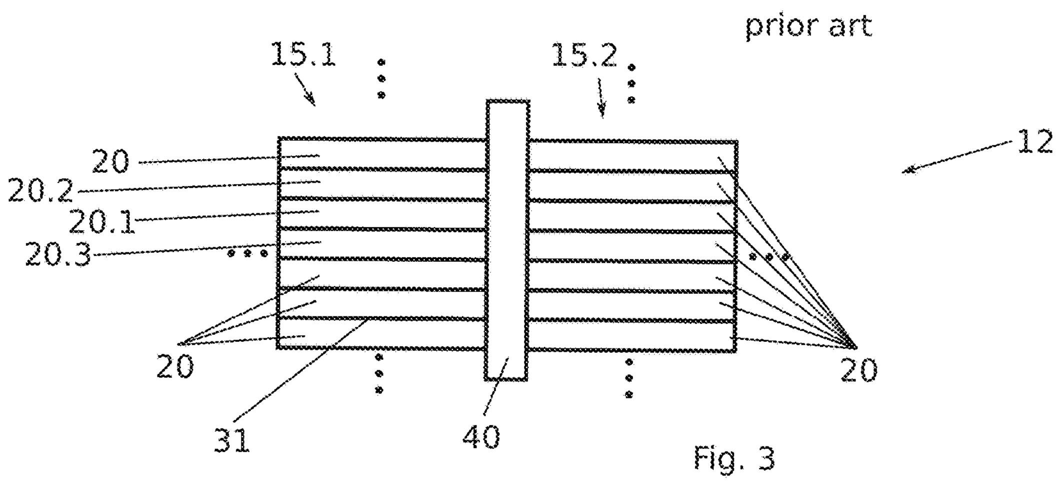
FIG. 3 is a schematic view of a conventional battery module.

FIG. 3 illustrates a schematic view of a battery module 12 according to the prior art. The conventional battery module 12 includes two battery cell groups 15.1 and 15.2, each with a plurality of battery cells 20 stacked onto each other. High energy densities of the battery cells 20 and a high packing density of the battery cells 20 within the battery module 12 and in thermal contact between the battery cells 20 leads to increased safety issues in the event of thermal runaway. If the battery cell 20.1, for example, goes into thermal runaway, battery cell 20.1 will heat up in thermal runaway and the battery cell 20.1 transfers this heat to its two nearest neighbors, the two battery cells 20.2, 20.3 within the battery cell group 15.1 or 15.2 which are touched (e.g., which are in contact) via a longitudinal side surface 31 of the battery cell 20.1 (e.g., in its x-direction). Each neighboring battery cell 20.2, 20.3 receives about half of the released energy and consequently heats up, which is often sufficient to trigger thermal runaway. This propagation continues until all battery cells 20 in the cell stack (e.g., the cell group 15.1 or 15.2) are in thermal runaway. The battery module 12 includes a cross-beam 40 as a part of a supporting structure of the battery module 12. The cross-beam 40 provides compartmentalization of the battery module 12 (e.g., a plurality of chambers is formed in which the battery cell groups 15 are arranged). By using suitable measures, thermal runaway may be prevented from spreading across the cross-beam 40 and throughout the entire battery module 12. However, in principle, the thermal runaway may propagate across the cross-beam 40 from one of the two battery cell groups 15.1 to the other cell group 15.2. To achieve compartmentalization in the stacking direction, in the conventional arrangement, spacers are typically used in the stacking direction. A sufficiently thick spacer arranged, for example every seventh cell, may provide similar compartmentalization as shown the arrangement in FIG. 1.

The dots in FIG. 3 indicate that the battery module 12 can include more battery cells 20 than are illustrated. For example, the battery module 12 may include any number of battery cells 20.

FIG. 4 illustrates a schematic view of a battery module 12 according to an embodiment of the present disclosure.

The battery module 12 includes two first battery cell groups 15.1, 15.2 and two second battery cell groups 16.1, 16.2. Each of the first battery cell groups 15.1, 15.2 and each of the second battery cell groups 16.1, 16.2 includes a plurality of stacked prismatic battery cells 20.1, 20.2, 20.3, 20.4, 20.5, 20.6, 20.7. The dots in FIG. 4 indicate that the battery module 12 may include more battery cell groups 15.1, 15.2, 16.1, 16.2 than are illustrated. Also, the number of battery cells 20.1, 20.2, 20.3, 20.4, 20.5, 20.6, 20.7 can be different than is illustrated. The battery module 12 may include any suitable number of battery cells 20.1, 20.2, 20.3, 20.4, 20.5, 20.6, 20.7 and/or battery cell groups 15.1, 15.2, 16.1 16.2.

The number of battery cells 20.1, 20.2, 20.3, 20.4, 20.5, 20.6, 20.7 in each of the first battery cell groups 15.1, 15.2 is equal to each other. The number of battery cells 20.1, 20.2, 20.3, 20.4, 20.5, 20.6, 20.7 in each of the second battery cell groups 16.1, 16.1 is equal to each other. The number of battery cells 20.1, 20.2, 20.3, 20.4, 20.5, 20.6, 20.7 in each of the first battery cell groups 15.1, 15.2 equals the number of battery cells 20.1, 20.2, 20.3, 20.4, 20.5, 20.6, 20.7 in each of the second battery cell groups 16.1, 16.2. Each of the battery cells 20.1, 20.2, 20.3, 20.4, 20.5, 20.6, 20.7 has the same prismatic shape. This allows for an effective arrangement of the battery groups 15.1, 15.2, 16.1, 16.2 in the battery module 12.

Each of the first battery cell groups 15.1, 15.2 is arranged adjacent to two second battery cell groups 16.1, 16.2. For example, each one of the first battery cell groups 15.1, 15.2 is arranged side-by-side with (e.g., is arranged between) two second battery cell groups 16.1, 16.2. In other words, the two first battery cell groups 15.1, 15.2 and the two second battery cell groups 16.1, 16.2 are neighboring battery cell groups 15.1, 15.2, 16.1, 16.2. Similarly, each of the second battery cell groups 16.1, 16.2 is arranged adjacent to two first battery cell groups 15.1, 15.2.

The first battery cell groups 15.1, 15.2 and second battery cell groups 16.1, 16.2 are arranged to be alternatingly stacked (or alternatingly arranged). The battery cells 20.1, 20.2, 20.3, 20.4, 20.5, 20.6, 20.7 of the first battery cell groups 15.1, 15.2 are oriented orthogonally to the battery cells 20.1, 20.2, 20.3, 20.4, 20.5, 20.6, 20.7 of the second battery cell groups 16.1, 16.2.

The first battery cell groups 15.1, 15.2 and the secondary battery cell groups 16.1, 16.2 are arranged on a two-dimensional lattice, and the lattice has lattice sites arranged in at least two rows and at least two columns. Either one of the first battery cell groups 15.1, 15.2 or one of the second battery cell groups 16.1, 16.2 is arranged on each lattice site. The battery module 12 includes a cross-beam 40 arranged between two columns. The cross-beam 40 can support (e.g., withstand) side-crush loads. In light of the expected values for the swelling force that a battery cell 20.1, 20.2, 20.3, 20.4, 20.5, 20.6, 20.7 generates in its x-direction, the necessary strength of the battery cell 20.1, 20.2, 20.3, 20.4, 20.5, 20.6, 20.7 housing in its y-direction can be determined. If the housing is not sufficiently strong for a given battery cell 20.1, 20.2, 20.3, 20.4, 20.5, 20.6, 20.7, additional support structures can be included. In some embodiments, the battery module 12 includes at least two (e.g., a plurality of) cross-beams 40, and the two cross-beams 40 may be arranged orthogonally to each other. Such an arrangement provides for compartmentalization of the battery module 12 into compartments. Therein, the cross-beams 40 are arranged so that a width of the compartments match the width of the battery cells 20.1, 20.2, 20.3, 20.4, 20.5, 20.6, 20.7. Thus, the battery cells 20.1, 20.2, 20.3, 20.4, 20.5, 20.6, 20.7 are to be stacked perpendicular to the width of the compartments.

The battery module 12 includes thermally insolating spacers arranged between the battery cell groups 15.1, 15.2, 16.1, 16.2.

Each of the battery cells 20.1, 20.2, 20.3, 20.4, 20.5, 20.6, 20.7 has a longitudinal side surface 31 and a narrow side surface 32.1, 32.2, 32.3, 32.4, 32.5, 32.6, 32.7 that is smaller than the longitudinal side surface 31. Within each of the first battery cell groups 15.1, 15.2 and each of the second battery cell groups 16.1, 16.2, the battery cells 20.1, 20.2, 20.3, 20.4, 20.5, 20.6, 20.7 are stacked so that the longitudinal side surfaces 31 of two contacting (e.g., two directly adjacent) battery cells 20.1, 20.2, 20.3, 20.4, 20.5, 20.6, 20.7 touch (or contact or face) each other. This allows for efficient stacking of battery cell groups 15.1, 15.2, 16.1, 16.2 and efficient heat transfer between battery cells 20.1, 20.2, 20.3, 20.4, 20.5, 20.6, 20.7 within the respective battery cell group 15.1, 15.2, 16.1, 16.2. The first battery cell groups 15.1, 15.2 and the second battery cell groups 16.1, 16.2 are arranged so that one battery cell 20.1, 20.2, 20.3, 20.4, 20.5, 20.6, 20.7 of the first battery cell group 15.1, 15.2 is arranged to touch a plurality of, or each of, the cells 20.1, 20.2, 20.3, 20.4, 20.5, 20.6, 20.7 of a neighboring second battery cell group 16.1, 16.2 with their narrow side surfaces 32.1, 32.2, 32.3, 32.4, 32.5, 32.6, 32.7. This allows for efficient heat transfer between battery cells 20 of adjacent battery cell groups 15.1, 15.2, 16.1, 16.2.

The dimensions of the battery cell 20.1, 20.2, 20.3, 20.4, 20.5, 20.6, 20.7 perpendicular to the x- and y-direction (e.g., elongation amounts or lengths) match in the sense that its dimension perpendicular to the x-direction is an integer multiple of the dimension perpendicular to the y-direction (see, e.g., FIG. 2 for coordinate system). Thus, the surface area of the longitudinal side surface 31 is an integer multiple of the surface area of the narrow side surface 32.1, 32.2, 32.3, 32.4, 32.5, 32.6, 32.7. The longitudinal side surface 31 of the battery cell 20.1 of the first battery cell groups 15.1 contacts a plurality of narrow side surfaces 32.1, 32.2, 32.3, 32.4, 32.5, 32.6, 32.7 of the battery cells 20.1, 20.2, 20.3, 20.4, 20.5, 20.6, 20.7 of the neighboring second battery group 16.1. Each of the battery cells 20.1, 20.2, 20.3, 20.4, 20.5, 20.6, 20.7 of the second battery cell group 16.1 is arranged so that the narrow side surface 32.1, 32.2, 32.3, 32.4, 32.5, 32.6, 32.7 contacts the longitudinal side surface 31 of the battery cell 20.1 of the first battery cell group 15.1. The sum of the areas of the narrow side surfaces 32.1, 32.2, 32.3, 32.4, 32.5, 32.6, 32.7 is less than or equal to the area of the longitudinal side surface 31.

In some embodiments, when the battery cell 20.1, 20.2, 20.3, 20.4, 20.5, 20.6, 20.7 dimensions do not match in the above-mentioned sense (e.g., the longitudinal side surface is not an integer multiple of the narrow side surface), additional spacers at the end of the cell stacks or between the battery cells 20.1, 20.2, 20.3, 20.4, 20.5, 20.6, 20.7 may be include to enable an effective arrangement of battery cell groups 15.1, 15.2, 16.1, 16.2 in the battery module 12.

Arranging the battery cell groups 15.1, 15.2, 16.1, 16.2 so that they are alternatingly stacked provides a checkerboard pattern. In the event of a thermal runaway, each of the battery cells 20.1, 20.2, 20.3, 20.4, 20.5, 20.6, 20.7 within one square (e.g., site) of the checkerboard (e.g., within one of the battery cell groups 15.1, 15.2, 16.1, 16.2) will likely go into thermal runaway one after the other. However, the last battery cell 20.1, 20.7, which is arranged at the boundary of the battery cell group 15.1, 15.2, 16.1, 16.2, will transfer its thermal energy via its longitudinal side surface 31 (e.g., perpendicular to the x-direction according to FIG. 2) to a plurality of battery cells 20.1, 20.2, 20.3, 20.4, 20.5, 20.6, 20.7 of the neighboring battery cell group 15.1, 15.2, 16.1, 16.2 via their narrow side surfaces 32.1, 32.2, 32.3, 32.4, 32.5, 32.6, 32.7 (e.g., perpendicular to the y-direction according to FIG. 2). By distributing the energy of the thermal runaway to seven cells of the neighboring battery cell group 15.1, 15.2, 16.1, 16.2, each will heat up by, for example, about 143° C., which should not trigger a thermal runaway.

Each of the first battery cell groups 15.1, 15.2 and each of the second battery cell groups 16.1, 16.2 is illustrated as having a square cross-section. However, in other embodiments, the battery cell groups 15.1, 15.2, 16.1, 16.2 have a different rectangular cross-section by including spacers between neighboring battery cell groups 15.1, 15.2, 16.1, 16.2. The prismatic shape of the battery cells 20.1, 20.2, 20.3, 20.4, 20.5, 20.6, 20.7 implies that the battery cell groups 15.1, 15.2, 16.1, 16.2 have a rectangular cross-section and, in some embodiments, a square cross-section as in the illustrated embodiment. Each of the battery cells 20.1, 20.2, 20.3, 20.4, 20.5, 20.6, 20.7 has the same shape, and each of the first and second battery cell groups 15.1, 15.2, 16.1, 16.2 has the same shape with a square cross-section.

FIG. 5 illustrates a schematic view of a battery module 12 according to another embodiment of the present disclosure. Aspects and features of the embodiment shown in FIG. 5 that are the same or substantially similar to those of the embodiment shown in FIG. 4 will not be repeated and the differences therebetween will primarily be described.

Each of the first battery cell groups 15.1, 15.2 includes at least another one of the first battery cell groups 15.1, 15.2 as next-nearest neighbor, and said first battery cell group 15.1 and the next-nearest neighboring first battery cell group 15.2 are stacked in the same manner. One of the second battery cell groups 16.1, 16.2 is arranged between any pair of next nearest neighboring first battery cell groups 15.1, 15.2.

The battery module 12 includes busbars 41, which are schematically depicted, to electrically interconnect the battery cells 20 of the battery cell groups 15.1, 15.2, 16.1, 16.2 and to electrically interconnect the battery cell groups 15.1, 15.2, 16.1, 16.2. The busbars 41 are connected to the battery cell connectors 35 of the battery cells 20. In another embodiment, other current collector structures may be provided. FIG. 5 shows an example busbar layout for part of a cell stack.

In this embodiment, the battery cell groups 15.1, 15.2, 16.1, 16.2 are arranged on lattice sites of a one-dimensional lattice (e.g., the battery cell groups 15.1, 15.2, 16.1, 16.2 form a one-dimensional checkerboard pattern and are alternatingly arranged on the lattice sites of the one-dimensional lattice).

The dots in FIG. 5 indicate that the battery module 12 may include additional battery cells 20 and/or more battery cell groups 15.1, 15.2, 16.1, 16.2 than are illustrated. The battery module 12 may include any number of battery cells 20 and/or battery cell groups 15.1, 15.2, 16.1, 16.2.

| Some Reference Numerals | |
|---|---|
| 10 | battery pack |
| 12 | battery module |
| 15, 15.1, 15.2 | first battery cell group |
| 16, 16.1, 16.2 | second battery cell group |
| 20, 20.1, 20.2, 20.3, 20.4, 20.5, 20.6, 20.7 | battery cell |
| 31 | longitudinal side surface |
| 32, 32.1, 32.2, 32.3, 32.4, 32.5, 32.6, 32.7 | narrow side surface |
| 33 | casing cover |
| 34 | bottom surface |
| 35 | battery cell connector |
| 40 | cross-beam |
| 41 | busbar |
| 300 | vehicle |
| 301 | interconnects |
| 310 | motor |

What is claimed is:

1. A battery module comprising:

a plurality of first battery cell groups and a plurality of second battery cell groups, each of the first battery cell groups and each of the second battery cell groups comprising a plurality of stacked prismatic battery cells, each of the battery cells having the same shape and the same aspect ratio; and a cross-beam between a first set of battery cell groups and a second set of battery cell groups, the first set of battery cell groups comprising at least one of the first battery cell groups and at least one of the second battery cell groups, the second set of battery cell groups comprising at least one of the first battery cell groups and at least one of the second battery cell groups, wherein, within each of the first set of battery cell groups and the second set of battery cell groups, at least one of the first battery cell groups is arranged adjacent to at least one of the second battery cell groups, wherein, within each of the first set of battery cell groups and the second set of battery cell groups, the first battery cell groups and second battery cell groups are alternatingly stacked, wherein, within each of the first set of battery cell groups and the second set of battery cell groups, the battery cells of the first battery cell groups are oriented orthogonally to the battery cells of the second battery cell groups, and wherein, within each of the first set of battery cell groups and the second set of battery cell groups, one battery cell of one of the first battery cell groups directly contacts a plurality of the battery cells of a neighboring one of the second battery cell groups.

2. The battery module according to claim 1, wherein each of the neighboring first battery cell groups and second battery cell groups are alternatingly stacked.

3. The battery module according to claim 1, wherein a first one of the first battery cell groups and a second one of the first battery cell groups are next-nearest neighbors, and wherein the first one of the first battery cell groups and the next-nearest neighboring second one of the first battery cell groups are stacked in the same manner.

4. The battery module according to claim 1, wherein the first battery cell groups and the second battery cell groups are arranged in a two-dimensional lattice comprising lattice sites arranged in at least two rows and at least two columns, and wherein either one of the first battery cell groups or one of the second battery cell groups is arranged on each lattice site.

5. The battery module according to claim 1, wherein each of the battery cells has a narrow side surface and a longitudinal side surface, and wherein the longitudinal side surface of one of the battery cells of one of the first battery cell groups contacts the narrow side surfaces of a plurality of the battery cells of a neighboring one of the second battery cell groups.

6. The battery module according to claim 1, wherein one of the battery cells of one of the first battery cell groups has a longitudinal side surface contacting a plurality of narrow side surfaces of the battery cells of a neighboring one of the second battery cell groups, and wherein a sum of areas of the narrow side surfaces is less than or equal to an area of the longitudinal side surface.

7. The battery module according to claim 1, wherein a length of one of the battery cells in a first direction is an integer multiple of a length of the one of the battery cells in a second direction.

8. The battery module according to claim 1, wherein each of the first and second battery cell groups has the same shape and a square cross-section.

9. The battery module according to claim 1, wherein a number of the battery cells in each of the first battery cell groups and a number of the battery cells in each of the second battery cell groups is the same.

10. A battery pack comprising at least one of the battery modules as claimed in claim 1.

11. An electric vehicle comprising at least one of the battery packs as claimed in claim 10.

12. An electric vehicle comprising at least one of the battery modules as claimed in claim 1.

13. A method of assembling the battery module as claimed in claim 1, the method comprising:

providing the plurality of first battery cell groups and the plurality of second battery cell groups; and arranging at least one of the first battery cell groups adjacent to at least one of the second battery cell groups so that the first battery cell groups and second battery cell groups are alternatingly stacked.

14. The battery module according to claim 6, wherein the battery module comprises thermally insolating spacers arranged at an end of at least one of the second battery cell groups or between the battery cells of at least one of the second battery cell groups when the sum of the areas of the narrow side surfaces thereof is less than the area of the longitudinal side surface.

15. The battery module according to claim 1, wherein each of the battery cells having a pair of terminals at a top surface thereof, and wherein the top surfaces of the battery cells of the first battery cell groups and the top surfaces of the battery cells of the second battery cell groups face in the same direction.

16. The battery module according to claim 1, wherein the first set of battery cell groups is arranged opposite to the second set of battery cell groups across the cross-beam.

* * * * *